UNITED STATES PATENT OFFICE.

WILLIAM W. HUBBELL, OF PHILADELPHIA, AND RICHARD H. HUBBELL, OF CHESTER, PENNSYLVANIA.

IMPROVEMENT IN PROCESSES OF PURIFYING AND STRENGTHENING IRON IN A MOLTEN CONDITION FOR CASTING.

Specification forming part of Letters Patent No. 150,576, dated May 5, 1874; application filed April 25, 1874.

*To all whom it may concern:*

Be it known that we, WILLIAM WHEELER HUBBELL, of the city of Philadelphia, State of Pennsylvania, and RICHARD HENRY HUBBELL, of Chester City, Delaware county, and same State, have invented an Improved Process of Purifying and Strengthening Iron in a Molten Condition for Casting into a Mold, of which the following is a specification:

This invention relates to that class of processes employed for purifying and strengthening a molten mass of iron to be cast and solidified in a mold, or otherwise employed in the manufacture of iron.

In carrying out our invention, take of nitrate of potash, or saltpeter, one pound; of pulverized lime, one pound; of fine chloride of sodium, or salt, half a pound; of pulverized charcoal, half a pound; of pulverized clay, three pounds. Mix them together with about a pint of water, forming a thick wash or matrix. Place this matrix into and around the bottom of a receiver, into which the moiten iron is to be poured, washing it or spreading it over the bottom, so that it adheres thereto, and let it nearly or quite dry. Smelt the iron in a furnace in any manner to make it as pure or refined as possible.

We recommend the process patented by William Wheeler Hubbell, February 8, 1870, and improved and patented by him April 21, 1874, of record in the Patent Office.

When the iron is smelted in the furnace, draw off about seven hundred pounds of the molten iron, and pour it into the receiver containing the matrix upon the same, and let it flux; then remove or keep back the flux, and pour the iron into a mold of any desired shape. The mold may be a green-sand mold, a dry-sand mold, or a chill-mold, depending upon the article to be made, and the time and facilities for doing the work, as is well known. The iron may be drawn from the furnace direct into the receiver containing the matrix, but is less liable to permeate all of the iron, as it enters more slowly.

To cast large masses of iron in one mold, a series or sufficient number of receivers containing each a matrix must be used, and the quantity and proportions for each receiver may be varied more or less, and increased for very impure iron. Nitrate of soda may be used with or as a substitute for nitrate of potash, or saltpeter, to develop oxygen, and alkaline matter, with pulverized borax with or as a substitute for the lime and salt, to develop a flux to unite with the silica and alkaline matter, to prevent oxidation of the particles as they solidify; and carbonate of soda may be used with or as a substitute for the chloride of sodium in the matrix of clay.

This invention is an improved economical method of carrying into effect on a smaller scale the principles heretofore discovered and patented by William Wheeler Hubbell, and we contemplate using the pulverized lime and salt, or carbonate of soda, as a substitute for the pulverized borax mixed with the saltpeter by means of the tube *e*, described in his patent of February 8, 1870, No. 99,677, and by means of the cast-iron cases described in his patent of April 21, 1874, in case the borax becomes too expensive or scarce, using the atmospheric air to force these ingredients among and into the molten particles of iron in the furnace, and thus obtain the iron as pure as possible from the furnace at the least expense. The proportions of the ingredients and of iron may be varied without changing our invention.

The development of the gases from the matrix of clay, compounded as described, forces upward into and among the molten particles of iron in the receiver the flux and alkaline matter formed by the clay, lime, and salt, and the oxygen gas unites in the combustion of the sulphur, phosphorus, and carbon. The chlorine assists the union of the flux with the silica, purifying the iron; and the alkaline matter prevents oxidation of the particles of molten iron, and they unite on solidifying, when cast into a mold, with great purity and strength. The pulverized charcoal may be omitted, but it assists to support the combustion in the separate receiver, and slightly carbonize or soften the iron. We do not confine ourselves to the proportions of ingredients stated.

We do not claim lining the bottom and sides of a receiver, or either of them, with a wash or dough of binoxide or hyperoxide of black manganese, with or without sesquioxide of iron, water, and carbonate of soda; nor of introducing gas or matter into the iron by a lining to the receiver, as that method has been long known.

What we claim is—

1. The composition for purifying and strengthening iron, consisting of a matrix of clay, saltpeter, lime, salt, and charcoal in the bottom of a receiver, upon which the molten metal is poured and allowed to flux, as described.

2. The composition for purifying and strengthening iron, consisting of a matrix of clay, saltpeter, lime, and salt in the bottom of a receiver, upon which the molten metal is poured and allowed to flux, as described.

3. The combined process of purifying and strengthening iron, consisting of driving, with and by means of atmospheric air, into and among the molten iron in the furnace, a compound of pulverized lime and salt, or equivalent flux, and alkaline matter, and drawing off and pouring the molten iron upon a matrix of saltpeter, lime, salt, and clay, allowing it to flux, and pouring the iron into a mold, as described.

4. The process of purifying and strengthening iron, consisting of driving, with and by means of air or oxygen gas, into and among the molten iron, a compound of pulverized lime and salt, and allowing it to flux the iron in the furnace or separate receptacle, as described.

WM. WHEELER HUBBELL.
RICHARD HENRY HUBBELL.

Witnesses:
JNO. E. CLYDE,
G. MORRIS.